March 23, 1954

I. M. STEIN ET AL 2,673,136

MULTIRANGE MEASURING SYSTEM

Filed Sept. 22, 1948

INVENTORS
IRVING M. STEIN
ALBERT J. WILLIAMS JR.
BY FRANK F. DERN, JR.

Woodcock and Phelan
ATTORNEYS

March 23, 1954  I. M. STEIN ET AL  2,673,136
MULTIRANGE MEASURING SYSTEM
Filed Sept. 22, 1948  6 Sheets-Sheet 3

INVENTORS
IRVING M. STEIN
ALBERT J. WILLIAMS, JR.
FRANK F. DERN, JR.
BY Woodcock and Phelan
ATTORNEYS March 23, 1954     I. M. STEIN ET AL     2,673,136
MULTIRANGE MEASURING SYSTEM
Filed Sept. 22, 1948                                 6 Sheets-Sheet 4

INVENTORS
IRVING M. STEIN
ALBERT J. WILLIAMS, JR.
FRANK F. DERN, JR.
BY Woodcock and Phelan
ATTORNEYS March 23, 1954  I. M. STEIN ET AL  2,673,136
MULTIRANGE MEASURING SYSTEM
Filed Sept. 22, 1948  6 Sheets-Sheet 5

INVENTORS
IRVING M. STEIN
ALBERT J. WILLIAMS, JR.
FRANK F. DERN, JR.
BY
Woodcock and Phelan
ATTORNEYS March 23, 1954  I. M. STEIN ET AL  2,673,136
MULTIRANGE MEASURING SYSTEM
Filed Sept. 22, 1948
6 Sheets-Sheet 6

INVENTORS
IRVING M. STEIN
ALBERT J. WILLIAMS, JR.
FRANK F. DERN, JR.
BY Woodcock and Phelan
ATTORNEYS Patented Mar. 23, 1954

2,673,136

UNITED STATES PATENT OFFICE 2,673,136

MULTIRANGE MEASURING SYSTEM

Irving M. Stein and Albert J. Williams, Jr., Philadelphia, and Frank F. Dern, Jr., Willow Grove, Pa., assignors to Leeds and Northrup Company, Philadelphia, Pa., a corporation of Pennsylvania Application September 22, 1948, Serial No. 50,638

14 Claims. (Cl. 346—33)

This invention relates to multi-range measuring systems, and particularly concerns self-balancing arrangements in which there is provision for indicating or recording a limit of the particular range in use in addition to indicating or recording magnitudes of the measured condition within the limits of that range.

Generally in accordance with the present invention, as the slidewire or equivalent circuit element of a self-balancing measuring network approaches either limit of its range of adjustment, it actuates a control switch in circuit with a motor device which, upon energization, effects a step of adjustment of a range-impedance and concurrently re-positions the range-indicating or range-recording element. A second control switch de-energizes the motor allowing time for the re-balancing mechanism of the network to move the slidewire from its aforesaid limit if the adjustment of the range-impedance has been sufficient, and if not, to provide for one or more additional adjusting steps thereof as may be necessary.

In some forms of the invention, the aforesaid motor device is of the solenoid type energizable for selective actuation of directional ratchet mechanisms, and the aforesaid second control switch therefor is independently operated as by a thermostat or a motor-driven cam. In other forms of the invention, the motor device is a reversible motor whose armature is coupled to an actuator for the aforesaid second controlled switch, and in a preferred arrangement the armature is coupled to the range switch through a Geneva mechanism to effect a step adjustment well before deenergization of the motor by the aforesaid second control switch. In another preferred arrangement, the motor is an alternating current motor which is plugged by direct current upon actuation of the aforesaid second control switch so as to prevent overrunning of the range switch contact.

In those forms of the invention providing for periodic printing of the selected range upon a recorder chart, an inking pad or roll is moved into and out of engagement with the range-printing element as the latter moves from its inactive position toward engagement with the recorder chart. In one embodiment involving printing, the printing mechanism is temporarily disabled during a range-stepping operation to preclude injury to the printing element or its inking element. More specifically, a small generator driven with the rebalancing slidewire produces during a range-stepping operation, sufficient output to effect movement of a lock bar or equivalent preventing operation of the printing mechanism during the range-stepping operation.

The invention further resides in features of construction, operation and arrangement hereinafter described and claimed.

For a more detailed understanding of the invention and for illustration of various embodiments thereof, reference is made to the accompanying drawings in which.

Figures 1, 4:
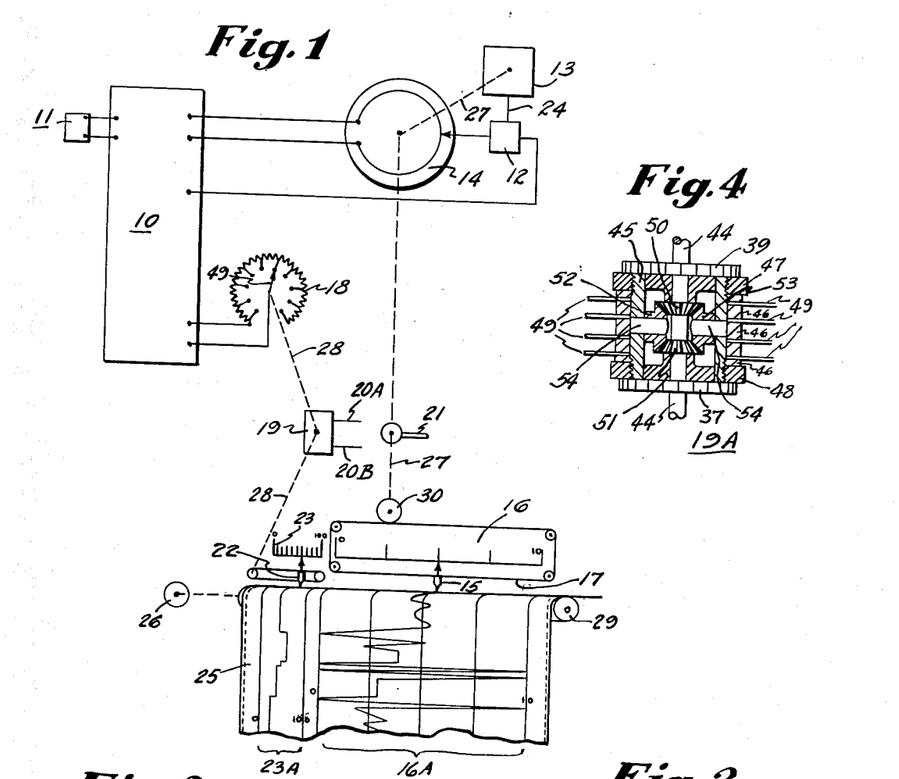
Fig. 1 schematically illustrates a multi-range measuring system embodying the invention.
Figs. 3 and 4 are detail views of one form of ratchet type of motor device utilizable in the control circuits of Figs. 2 and 7.

Referring to Fig. 1, the block 10 is generically representative of a measuring network such as a potentiometer, bridge or the like which is unbalanced in response to the change in magnitude of a condition, such as temperature, pressure, ion-concentration or other variable to which an appropriate primary device 11 is responsive. By way of example, the primary device may be a thermocouple, a resistance-thermometer, a pH cell, or other device for producing an electrical effect varying as a function of the condition to be measured. A suitable detector 12 responsive to the unbalance of the network 10 controls a rebalancing mechanism or device generically represented by the block 13 to effect adjustment of the slidewire 14 of the network 10 in proper sense to restore it to balance. The detector 12 may be a galvanometer as in Squibb Patent No. 1,935,732 and the rebalancing mechanism 13 may be of the mechanical type shown in that patent: or the detector and the rebalancing mechanism may be of the types shown in Williams Patents Nos. 2,113,164 and 2,113,436 in which a thermionic amplifier in response to unbalance of the network controls a reversible motor to effect a high-speed rebalancing adjustment of slidewire 14. In Fig. 1 and subsequent figures, the electrical or mechanical connection between detector 12 and rebalancing mechanism 13 is generically represented by line 24.

The slidewire 14 is coupled as by a flexible cord 17 to an exhibiting element 15 movable with respect to a stationary scale 16; alternatively, or in addition, the exhibiting element 15 may be a recorder stylus or pen, producing a continuous or intermittent trace on a recorder chart 25 having a scale 16A of extent corresponding with the range of slidewire movement. The driving cord 17 for pen or stylus 15 is driven by pulley 30 suitably coupled to shaft 27. The chart roll 29 is driven at low constant speed by an electric motor 26 or equivalent.

The measuring network 10 includes a range-changing impedance 18 adjustable step-by-step to extend the range of measurement beyond that afforded by slidewire 14 itself. By way of example, each section of the impedance 18 may correspond with a substantial fraction of the range of slidewire 14 thus to provide consecutive ranges of measurement preferably with slight overlap. The stepping adjustments of impedance 18 are effected by a motor device, generically represented in Fig. 1 by block 19, which is energized automatically to effect a step adjustment of the impedance 18 in one sense or the other when the slidewire 14 is moved to the upper or lower limit of its range of adjustment. Several specifically different forms of motor device 19 are herein later described. In each of their control systems, a control member 20A is engaged by a cam or arm 21 on the shaft 27 when the slidewire 14 reaches approximately the "low" limit of its range of adjustment to effect energization of motor device 19 for adjustment of impedance 18 to the next lower measuring range. When the slidewire 14 is adjusted to the "high" limit of its range of adjustment, the control arm 21 engages the other motor control member 20B for energization of the motor device 19 in proper sense to advance the impedance 18 to the next higher range.

Concurrently with each stepping adjustment of impedance 18, a second exhibiting element 22 is moved with respect to a stationary range-indicating scale 23; alternatively, or in addition, the exhibiting element 22 may serve as a stylus or pen to cooperate with a range-scale 23A of the recorder chart 25.

By way of example, assuming the device is for measurement of temperatures from 0° to 100°, the range of adjustment of slidewire 14 may correspond with an eleven-degree change and the total range of adjustment of impedance 18 may correspond with ten 10° changes. Accordingly, the pointer or pen 22 gives a coarse indication or record of the temperature and the position of pen or pointer 15 gives the fine or vernier indication on the extended scale 16 or 16A and, in the specific example assumed, the positions, in Fig. 1, of the two pens or pointers correspond with a temperature of 65°, the position of pointer 22 corresponding with the range digit 6 and the position of pointer 15 corresponding with the slidewire digit 5.

Figure 2:
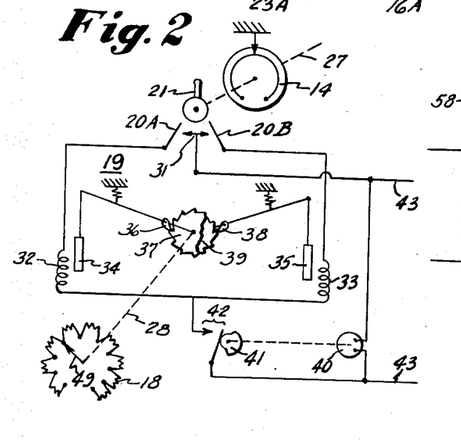
Fig. 2 is a schematic circuit diagram of a ratchet motor device and control circuit utilizable in the system of Fig. 1.

In the particular form of range-changing mechanism 19 and control system therefor shown in Fig. 2, the control members 20A and 20B are movable switch contacts moved into engagement with fixed contact 31 by control arm or cam 21 as the slidewire 14 arrives at or about one or the other limits of its travel thus to select for energization one or the other of the solenoids 32, 33. Assuming the coil solenoid 32 is energized, its core or armature 34 is moved downwardly to effect a one-step adjustment of the contact 49 of impedance 18 in counterclockwise direction through the pawl 36 and ratchet 37. Conversely, if the solenoid 33 is energized, the movement of its core 35 is transmitted through the pawl 38 and ratchet 39 to effect a one-step clockwise adjustment of the range-contact 49.

As thus far described, in event of a sudden change in the magnitude of the measured condition to extent corresponding with more than one stepping adjustment of impedance 18, the solenoid 32 or 33 would remain energized at the end of one stepping adjustment and accordingly the range of measurement would not be sufficiently increased or decreased. In the particular arrangement shown in Fig. 2, this difficulty is overcome by inclusion in the energizing circuit of the solenoids of a switch 42 periodically actuated by cam 41 driven by motor 40 for convenience supplied from the same A. C. or D. C. power line 43, 43 provided for energization of the solenoids. Therefore, so long as the slidewire-limit cam 21 maintains engagement between contact 31 and one or the other of the motor control contacts 20A, 20B, the impedance 18 is intermittently advanced step-by-step until there is a reverse adjustment of the slidewire 14 which occurs when the balance point of the measuring network 10 has been brought within the limits of one of the measuring ranges afforded by impedance 18. The interval between successive closures of switch 42 is sufficiently long to allow the detector 12 and rebalancing mechanism 13 to determine whether the range has been shifted to suitable extent and if so, to move the slidewire 14 away from its upper or lower limit as the case may be.

Figure 3:
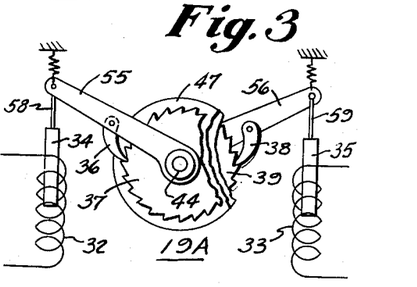

In the particular form of range-stepping mechanism 19A shown in Figs. 3 and 4, the ratchets 39 and 37 are rotatably mounted upon a shaft 44 and upon their hubs is rotatably mounted a differential drum 45. The rings 47, 48 which threadably engage the opposite ends of the drum are tightened to clamp the contacts 49 of range-impedance 18 and the interleaved spacing rings 46. As the drum 45 is rotated in manner later described, the range contacts 49 successively engage fixed contacts (not shown) of a drum-switch to effect step-by-step adjustment of the range-impedance.

The bevel bears 50 and 51 of the differential, respectively fastened to the ratchets 39 and 37 for rotation therewith, engage the idler gears 52 and 53 which are freely rotatable on the stub shafts 54, 54 extending inwardly from the drum or barrel 45 of the differential. Actuation of ratchet 37 by solenoid 32 effects angular movement of the contact barrel 45 in counterclockwise direction and through an angle which is one-half that of the movement of ratchet 37; similarly, actuation of ratchet 39 by its solenoid 33 effects movement of the contact drum in clockwise direction with a two to one reduction. As shown in Fig. 3, the actuating pawl 36 of ratchet 37 is pivoted upon an arm 55 rotatable upon shaft 44 and connected by link 58 to core 34; similarly, the actuating pawl 38 of ratchet 39 is pivoted upon an arm 56 rotatable upon shaft 44 and connected by a link 59 to core 35.

Thus, as will be understood from the prior description of Figs. 1 and 2, when the slidewire 14 has been adjusted to one limit of its movement, one of the ratchets 39, 37 is actuated to shift the range contacts 49 in corresponding sense and conversely, when the slidewire 14 has been adjusted to the other limit of its movement, the other of the ratchets is actuated to adjust the impedance 18 in reverse sense. If the slidewire remains at either limit of its travel, the corresponding ratchet is actuated as many times as is necessary to shift the measuring range so that balance of network 10 may be effected by adjustment of slidewire 14: the initial step is effected by the last closing of switch 42 and contact 20A (or 20B) and all subsequent steps, if any, are effected by reclosure of switch 42.

Figure 5:
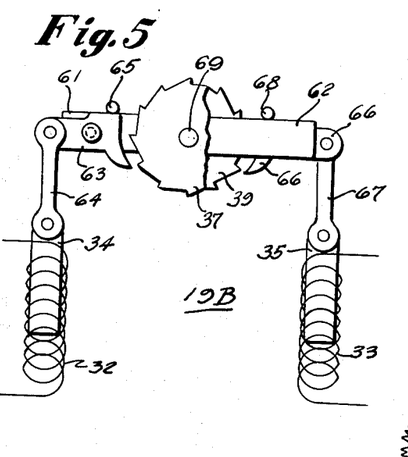
Figs. 5 and 6 are views of another form of ratchet motor device utilizable in the circuits of Figs. 2 and 7.
Figure 6:
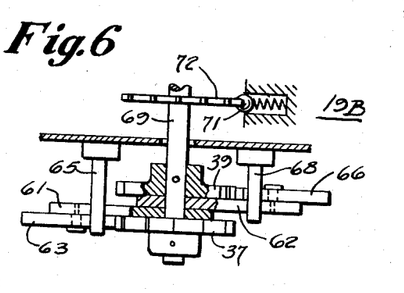

Another form of range-adjusting device 19B is shown in Figs. 5 and 6. It is generally similar to that shown in Figs. 3 and 4 and accordingly, corresponding elements of both forms have been identified by like reference characters. In this modification, the ratchets 37 and 39 are secured to the shaft 69 of a wafer-type switch whose contacts provide for adjustment of the range-impedance 18, generally as described in connection with Fig. 1. The pawl-supporting arms 61 and 62, freely pivotally mounted upon shaft 69, are biased by spring means (not shown) against the fixed stops 65, 68. To the arm 61 is pivotally attached a pawl member 63 connected by link 64 to the core 34 of solenoid 32. Similarly, the pawl member 66 is pivotally mounted upon arm 62 and is connected by link 67 to the core 35 of solenoid 33. As will be understood from the prior description of Fig. 2, when one or the other of solenoids 32, 33 is energized, the associated pawl and ratchet effects stepping adjustment in proper sense of the movable contact structure of the range-impedance 18.

Preferably, there may be attached to the shaft 69, a disk 72 whose periphery is notched to engage the ball or detent 71 of a spring-latch arrangement, the position of notches in the detent wheel 72 corresponding with the contact positions.

Figure 7:
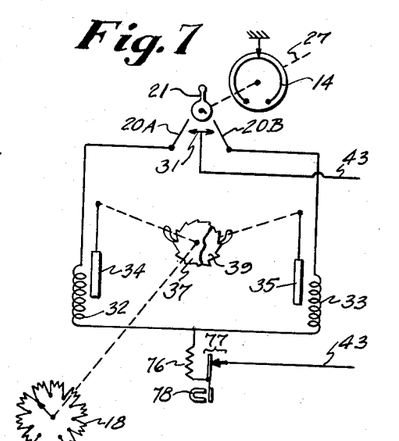
Fig. 7 is similar to Fig. 2 differing in the type of intermittent control switch.

Either of the ratchet stepping mechanisms 19A, 19B may be used in the motor-control system of Fig. 2 or of Fig. 7. In the latter, the periodically operated switch 42 of Fig. 2 is replaced by a thermostatically operated switch 77 preferably provided with a magnetic snap exemplified by magnet 78. When the cam 21 on the slidewire shaft 27 is out of engagement with both of the control contacts 20A, 20B, the heater coil 76 is deenergized and the thermostat switch 77 is closed and remains so for an appreciable time after the cam 21 engages one or the other of contacts 20A, 20B to energize the corresponding stepping solenoid 32 or 33 and the heater 76. With the slidewire 14 at either limit of its range, the corresponding contact 20A or 20B is held in engagement with contact 31 until one or more stepping adjustments of the ratchet mechanism so shift the measuring range that a reverse adjustment of the slidewire 14 is effected: the first step is effected by initial closure of contact 20A or 20B and any subsequent steps are effected by reclosure of the thermostat switch 77.

Figures 8, 20, 21, 22:
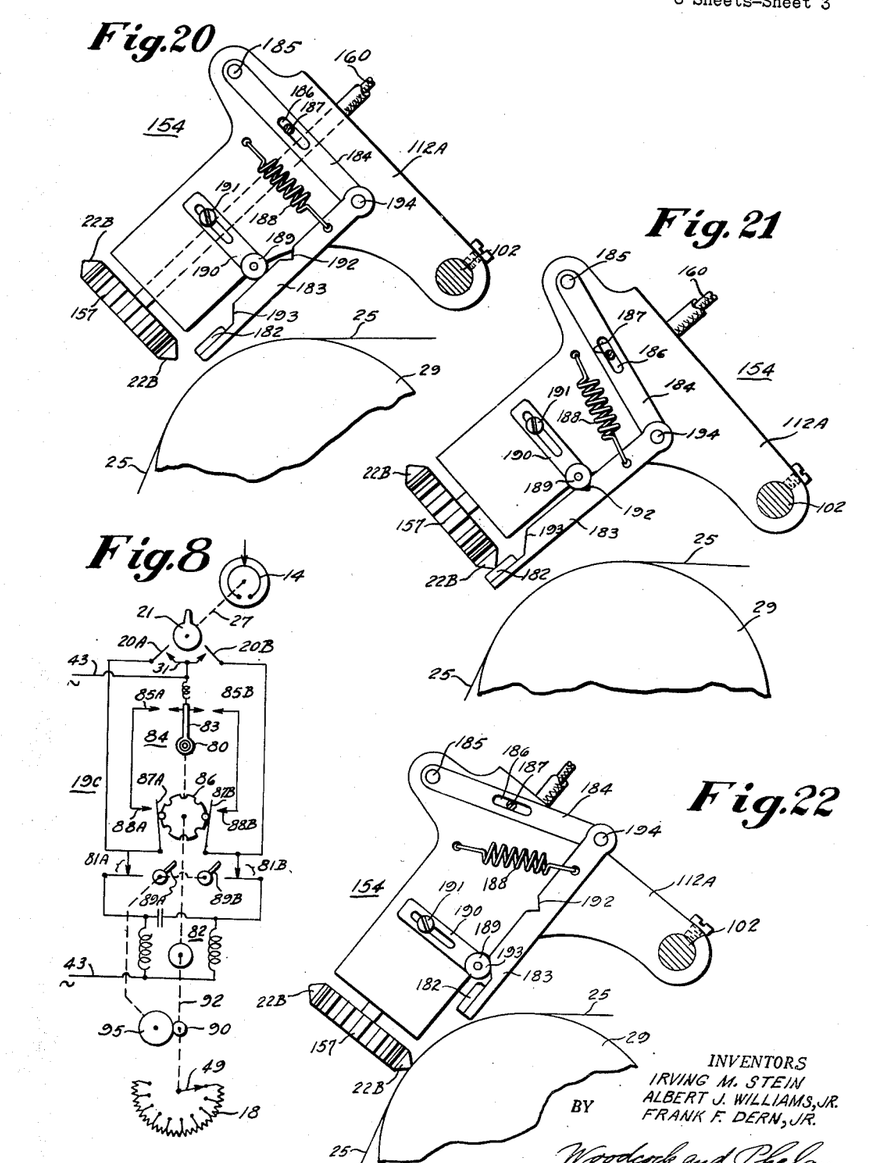
Figs. 8, 9 and 10 illustrate further modifications of range-stepping motors and control circuits each utilizable in the system of Fig. 1.
Figs. 20–22 illustrate one form of printing mechanism, the successive figures showing the successive positions of the printing and inking members.

A third form of range-stepping mechanism 19C is shown in Fig. 8. To the shaft 92 of a small reversible motor 82 is attached a notched disk 86 for actuating a pair of movable contacts 87A, 87B. For energization from alternating-current, the motor 82 may be, as shown, a "capacitor motor"; a split-field series motor may be sued for operation on either alternating-current or direct-current. The motor shaft 92 is also connected through a slip-clutch or friction drive 80 to a movable contact 83 adapted to engage one or the other of the fixed contacts 85A, 85B in dependence upon the direction of rotation of the motor. When the slidewire 14 reaches one or the other of its limit of travel, the corresponding contact 20A or 20B is moved into engagement with contact 31 so to initiate energization of the motor for adjustment of impedance 18 in proper direction. As soon as the motor 82 begins to turn, a lock-in circuit is completed either through the contacts 83, 85B, 87B, 88B or through contacts 83, 85A, 87A, 88A depending upon the direction of rotation of the motor. It is thus insured that contact 49 of the range-impedance 18 will continue to move from one fixed contact to the next even though the motor circuit through contact 20A or 20B is broken before the stepping adjustment is completed. At the end of a stepping adjustment, assuming contact 31 is not engaged by either of the starting contacts 20A, 20B, the motor circuit is deenergized under control of the notched disk 86 which effects separation of contacts 87A and 87B from the stationary contacts 88A, 88B. If the starting switch 20A or 20B remains closed after completion of one stepping adjustment, the motor 82 will continue to run for one or more additional control cycles and so effect intermittent stepping of the range switch until the rebalancing mechanism 13 in its adjustment of slidewire 14 moves the cam 21 away from the previously closed starting-switch 20A or 20B.

By way of example, the motor shaft 92 may make one revolution per minute so that for a 12-point range switch, the disk 86 will have 12 notches and the motor 82 will run five seconds to move the disk 86 one notch.

The cams 89A and 89B are so driven through reduction gearing 90, 95 that limit-switch 81A is opened when the impedance 18 is adjusted to one of its limits and that motor-limit switch 81B is opened when impedance 18 is adjusted to the other of its limits.

Figure 9:
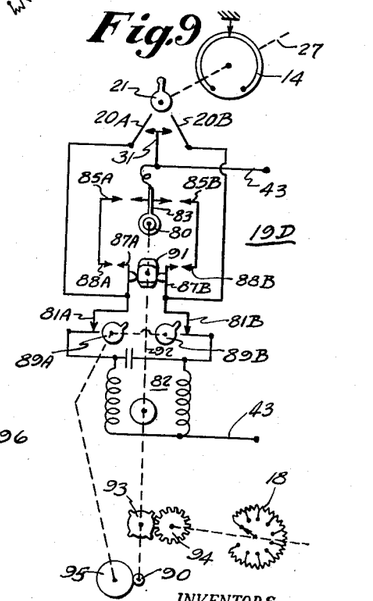

A modification 19D which provides more time than modification 19C between movement of the range switch and the end of the motor operation cycle, so to afford more time in which the recorder may come to balance, is shown in Fig. 9. On the motor shaft 92 are fastened a multilobed cam 91 and a mutilated gear 93 having a corresponding number of equally spaced teeth. The shaft 92 also drives a movable contact 83 through a friction clutch 80. Also, as in the system of Fig. 8, operation of the motor 82 is initiated upon engagement of cam 21 or equivalent with one or the other of the control contacts 20A, 20B. Immediately after such a starting impulse, the motor circuit is completed through a lock-in circuit completed by closure of contact 83 with one or the other of contacts 85A, 85B and by the closure of contacts 87A, 88A or 87B, 88B under control of the four-lobed cam 91. The motor continues to run until its circuit is interrupted under control of cam 91 which effects separation of contacts 87A, 87B from contacts 88A, 88B respectively. Well before the end of the cycle of motor energization, the mutilated gear 93 moves the associated gear 94 through an arc corresponding with one step of adjustment of impedance 18, to afford sufficient time for the operation of the recorder to move cam 21 away from contact 20A or 20B if within that cycle the measuring range has been shifted sufficiently to bring the balance point of network 10 within the new measuring range. If the extent of adjustment of impedance 18 has not been sufficient, the cam 21 remains against the corresponding starting contact 20A or 20B and the motor cycle is immediately re-initiated, the cycles continuing in uninterrupted sequence until cam 21 opens the starting contact 20A or 20B. In each cycle, the stepping adjustment of impedance 18 is followed by an interval sufficiently long to permit the detector 12 and rebalancing device to act.

In the particular device 19D, the shaft 92 rotates at a speed of one revolution per minute and the gear 93 has four teeth spaced 90° apart, so providing a motor period or cycle of fifteen seconds of which seven seconds are available for rebalancing of network 10 before the next cycle can be initiated. The gear reduction 90, 95 between the motor limit switches 89A, 89B and motor shaft 92 is such that when the impedance 18 is adjusted to either limit of its travel, the motor cannot be energized for further movement in the same direction but may of course be energized to effect a reverse adjustment of the impedance 18.

Figures 10, 17, 18, 19:
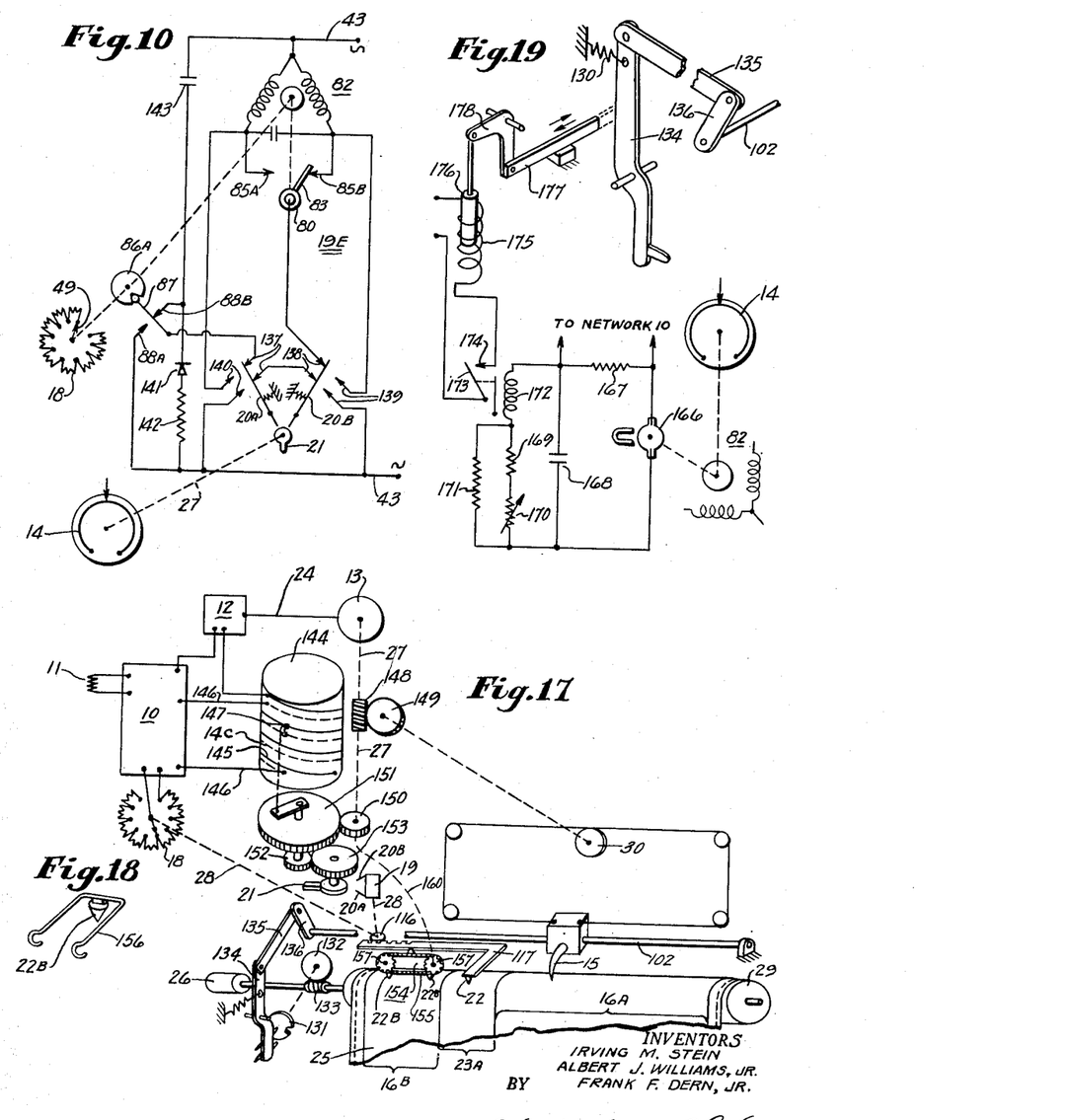
Fig. 17 schematically illustrates a multi-range measuring system using a multi-turn slidewire provided, inter alia, with a tractor printing element repeatedly covering a scale corresponding with a fraction of the total range of the slidewire.
Fig. 18 is a detail view on enlarged scale of the tractor chain used in Fig. 17.
Fig. 19 illustrates an arrangement for disabling the recorder-printing mechanism during range-stepping adjustment.

In Fig. 10 there is shown a modification 19E of the systems of Figs. 8 and 9 which provides for braking of the stepping-motor 82 of the range-changing impedance. As shown, motor 82 is a split-phase reversible induction motor. When the motor 82 is at rest, rectified direct current flows through it in a circuit including the current-limiting resistor 142, the rectifier 141, contacts 87, 88B of the range-changing device, contacts 137, 20A, 138 and 20B of the motor-starting switch and contacts 83, 85B (or 83, 85A) of the friction drive switch. When the slide-wire 14 reaches either limit of its travel, the cam 21 engages either of the starting contacts 20A, 20B to interrupt the direct-current circuit through the motor and to complete an A. C. circuit for starting of the motor through a corresponding one of contacts 139, 140. As soon as the motor starts, the friction-driven contact 83 moves to make the proper connection to keep the range-changing motor 82 operating in the direction it was started even though the starting contact 20A (or 20B) return to the position shown in Fig. 10. Also, as soon as the motor starts, the notched-disk 86A of the range-switch effects separation of contacts 87 and 88B to insure that the D. C. circuit is not restored even though contacts 20A, 20B return to the position shown in Fig. 10. Thus, the range-changing motor continues to operate on alternating-current to adjust contact 49 of the range impedance. While the motor 82 is running, the rectifier 141 charges the capacitor 143 so that when, at the end of a range step, the contact 87 is moved away from engagement with contact 88A and into engagement with contact 88B, the A. C. excitation of the motor is terminated and immediately thereafter the D. C. charge of condenser 143 is discharged through the motor to bring it to an abrupt stop.

Figure 11:
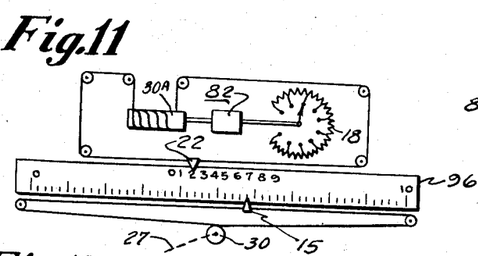
Figs. 11 and 12 illustrate composite range and vernier indicators utilizable in the system of Fig. 1.
Figure 12:
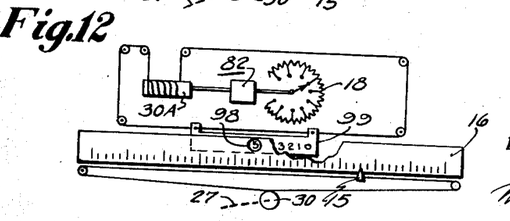

As shown in Fig. 11, the range-scale with which the pointer 22 coacts and the vernier scale with which the pointer 15 coacts may be combined in a single structure 96 instead of being separate as in Fig. 1. Alternatively, as shown in Fig. 12, the range scale may be on a movable slide 99 disposed behind the vernier scale 16 which in this case is provided with a window 98 through which the successive graduations or numerals of the range scale are successively visible as impedance 18 is adjusted to successive settings. Either of these arrangements may be used in substitution for the indicating scale arrangement shown in Fig. 1.

Figure 13:
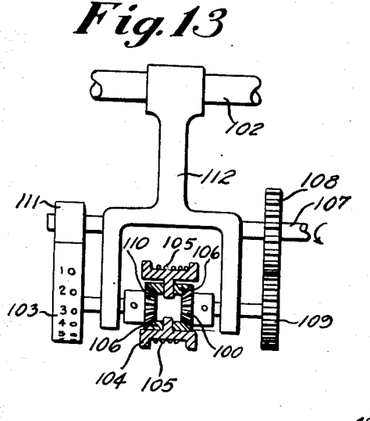
Figs. 13 and 14 are views of printing mechanism utilizable in the systems of Figs. 1, 16 and 17.
Figure 14:
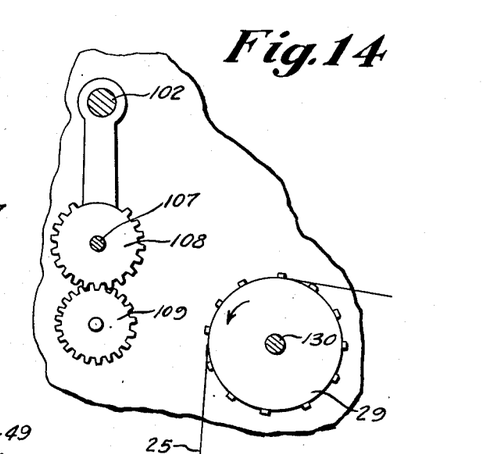

Figs. 13 and 14 disclose an arrangement for printing a range limit in use upon the recorder chart instead of making a range trace as in Fig. 1. The print wheel 103 having the various range-limit designations thereon at circumferentially spaced intervals is supported by a bracket 112 mounted upon and movable with a rock-shaft 102. At fixed intervals, the shaft 102 is swung towards the recorder chart 25 to print thereon a number or other symbol indicating the range-switch setting in use. The bracket 112 carries a differential assembly comprising the drum 104 having internal stub shafts upon which are freely rotatable the idler gears 106, 106. This drum is rotated in correspondence with the positions of the range switch by a flexible cord 105, or equivalent, so that printing wheel 103 is moved to positions corresponding with the setting of the range impedance.

The periphery of the printing wheel 103 is continuously in engagement with an inking wheel 111 and to provide that all characters on the wheel 103 be in readiness for printing, it is rotated between successive printing operations. To that end, the differential gear 100 is fastened to the shaft of a gear 109 which is intermittently coupled to the continuously rotating shaft 107 through a mutilated gear 108. The number of teeth of the mutilated driving gear 108 corresponds with the number of teeth of the driven gear 109 so that for each revolution of shaft 107, the print wheel 103 is rotated one revolution, the time interval afforded by mutilation of gear 108 corresponding with the interval during which shaft 102 is rocked to effect a printing operation. As the wheel 103 rotates a complete revolution for each inking operation, it is returned each time to the setting corresponding with that of the range switch in readiness for the next printing operation. The drive of the print wheel 103 for inking is from gear 100 through the idler gears 106 to the gear 110 attached to the print wheel shaft. The rotation of the print wheel 103 for its inking does not affect the position of the drum 105 which at all times corresponds with the existing setting of the range-changing switch.

Figures 15, 16:
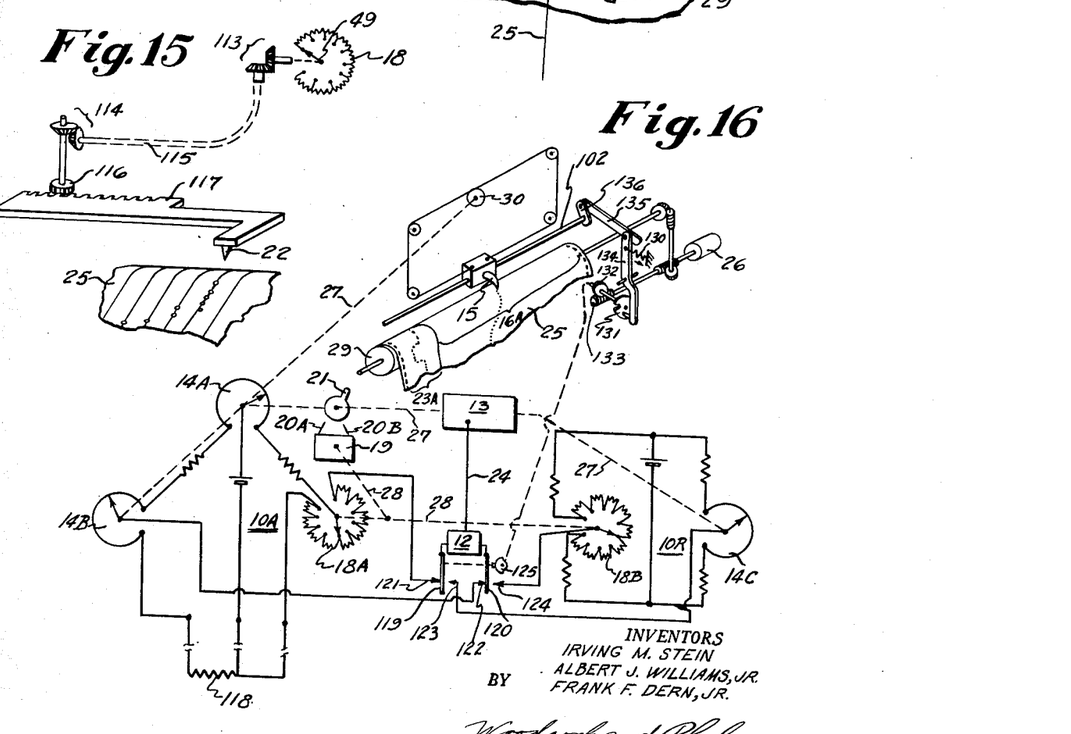
Fig. 15 illustrates another form of printing mechanism utilizable in the systems of Figs. 1 and 17.
Fig. 16 schematically illustrates a measuring system using measuring and range networks with a common unbalance detector.

Another arrangement for printing the range setting on the recorder chart is shown in Fig. 15. The printing stylus 22 is carried by a rack member 117 carried by a supporting bracket (not shown) equivalent to bracket 112 of Fig. 13 which is attached to the rock shaft 102 of the recorder. The movable contact 49 of the impedance 18 is coupled by gearing 113, flexible shaft 115 and gearing 114 to the rack-gear 116 also supported by the supporting bracket of rack 117. As the range-changing switch is stepped to its various settings, generally as described in connection with Fig. 1, the printing stylus 22 is concurrently moved to corresponding positions above the recorder chart. Accordingly, as the support for rack member 117 is moved toward and away from the recorder chart in each cycle of the recorder, the stylus 22 makes a dot or impression on the range scale of the chart 25 to indicate the then existing range setting of impedance 18.

Referring to Fig. 16, the measuring network 10A, shown by way of example, is a Wheatstone bridge of the type shown in Leeds Patent No. 1,097,651 for measurement of resistance, specifically the resistance of a temperature-responsive resistor 118. With the contacts 119, 120 in the position shown in Fig. 16, the detector 12 is responsive to unbalance of the measuring network 10A to effect a rebalancing adjustment of the slidewires 14A and 14B of that network by the rebalancing mechanism 13. Concurrently with adjustment of these slidewires, the recorder pen 15 is adjusted to corresponding position across the recorder chart above its vernier scale 16A. Assuming the temperature change is so great as to be above or below the range afforded by the slidewires, the cam 21 on the slidewire shaft is effective, as in systems previously described, to actuate one or the other of control members 20A, 20B whereupon the motor device 19 effects a stepping adjustment of the range-changing resistor 18A. Concurrently, with adjustment of resistor 18A, there is effected a corresponding stepping adjustment of range-repeater resistor 18B in a second network 10R.

During continued operation of the recorder, the chart motor 26, or other constant speed device, is effective through cam 125 to move the detector contacts 119, 120 out of engagement with contacts 121, 122 and into engagement with contacts 123, 124 thus to connect the detector 12 to the range-repeater network 10R. The rebalancing mechanism 13 accordingly effects a rebalancing adjustment of the slidewire 14C of the measuring network 10R and concurrently therewith the recorder pen 15 is moved to a corresponding position with respect to the scale 23A of the recorder chart. Depending upon the selected shape of cam 125, the intervals for recording on the coarse and fine scales may be equal or different: by way of example, the cam 125 may be so shaped and rotate at such speed that network 10A is connected to the detector for 2-second intervals and network 10R is connected to the detector for alternate 2-second intervals.

The mechanism for effecting the printing movements of the shaft 102 may be similar to that disclosed in Ross et al. Patent No. 2,113,748. Generally as schematically shown in Fig. 16, the motor 26 drives a notched disk or cam 131 through gearing 132, 133. When the same notch is in alignment with a projection of lever 134, the latter is free to move under its biasing spring 130 to actuate the link 135 and so rock the shaft 102 through the crank lever 136 to bring the pen 15 into engagement with chart 25. Shortly thereafter the cam 131 returns the parts to the position shown in Fig. 16.

As will be understood from the foregoing description of Fig. 16, one and the same pen 15, or equivalent, is used to print the coarse or range indications on scale 23A of chart 25 and the fine indications on scale 16A of the chart. Alternatively, the scales 16A and 23A may be coextensive and the printing mechanism associated with pen 15 so controlled, as in Fig. 4 of the aforesaid Ross Patent 2,113,748 as to make different traces, such as dots and dashes, respectively identifying the coarse and fine readings: or with coextensive scales 16A and 23A, the pen 15 may be replaced by a print wheel, such as in Fig. 3 of the aforesaid Ross patent, having different printing elements to distinguish between the coarse and fine readings.

In Fig. 17 there is disclosed a recorder suited for accurate measurement of small changes of resistance or other variable over a substantial range. The multi-turn slidewire 14C is provided with a movable contact 147 mechanically connected to the shaft of the rebalancing mechanism 13 by gears 150 and 151 having such ratio that, for example, one revolution of the shaft 27 corresponds with a one-quarter turn of the slidewire 14C. The ends of the slidewire 14C are connected to the measuring network 10. The slidable contact 147 of slidewire 14C is connected to one input terminal of detector 12 through conductor 145 which is wound around drum 144 parallel to the resistance wire forming the slidewire.

The rebalancing shaft 27 is also connected by flexible shaft 160 to a tractor printing device 154, and more particularly to one of a pair of sprockets 157 of the device which hold taut an endless chain 155 from which extend three printing points 22B equally spaced along the chain at distances each equal to the circumference of the sprocket 157. Hence, for a one-quarter turn of the slidewire 14C, the chain 155 will move a distance equal to the length of scale 16B of the recorder chart. For the complete range of a 15-turn slidewire 14C, the shaft 27 will therefore make sixty revolutions rotating the sprocket 157 a like number of revolutions and causing sixty traverses of the chart by the printing points. The reduction gearing 148, 149 between the main shaft 27 and the driving pulley 30 for the pen 15 is so proportioned as to cause the pen to traverse the scale 16A once for the complete range of slidewire 14C. In a particular instance, the scale 16A includes 60 chart divisions, each division corresponding with one-quarter turn of the slidewire 14C and with the chart range 16B allocated to the printing-points 22B. The record made by the printing points 22B for adjustment of slidewire 14C from one limit to the other is a series of sloped lines each corresponding with a quarter turn of the slidewire 14C, while the concurrent record made by pen 15 is a continuous slope corresponding with the entire range of movement of the slidewire 14C.

As hereinafter more fully described, the chain 155 and the printing points 22B are carried by a periodically rocked carriage supported from shaft 102 so that the sloped lines produced by them consist of a series of dots. The mechanism for effecting intermittent rocking of shaft 102 may be similar to that shown in the aforesaid Ross et al. patent and briefly described in connection with Fig. 15. The chain 155 consists of a series of U-shaped links 156, Fig. 18, to certain of which are attached, as by welding, the printing points 22B. The links 156 are preferably prestretched to a predetermined pitch.

The range-recording mechanism comprising the rack bar 117 and printing point 22 is similar to that discussed in connection with Fig. 14 and need not be further described.

It shall be understood that the gear reduction afforded by gears 152, 153 between the actuator shaft of slidewire contact 147 and the control cam 21 of the range-stepping mechanism is such that the control cam 21 respectively engages the control members 20A and 20B when the slidewire reaches the corresponding limits of its range of adjustment, specifically, for fifteen turns of the slidewire drum 144, the cam 21 actuates one or the other of control members 20A, 20B to step the impedance 18 to the next higher or the next lower range as required.

The circuit and mechanism shown in Fig. 19 is to prevent damage to the tractor-printing device 154 of Fig. 17 during actuation of the range-changing mechanism. Upon a change in range, the slidewire contact 147 (Fig. 17) is rapidly moved from one end of the slidewire towards the other so causing the points 22B on chain 155 to sweep across the printing zone of its travel at high speed. Since the inking and printing operations occur at frequent intervals, there is strong probability that in range-changing the rapidly moving points 22B may be brought into contact with the ink pad or chart with consequent injury.

Reverting to Fig. 19, the small generator or magneto-tachometer 166 is geared to the rebalancing motor 82, or equivalent, so that when the speed of the balancing motor is high, as during a range change, the output of the tachometer is sufficiently great to effect energization of a sensitive relay 172. The closure of the contacts 173, 174 of the relay effects energization of the solenoid 175. The resultant movement of the core 176 of the solenoid is transmitted to a lock-out bar 177 through a bell crank lever 178. The positioning of bar 177 in the path of the link 134 of the printing mechanism prevents the biasing spring 130 from effecting rocking movement of the shaft 102 of the recorder. There is thus prevented engagement of the printing points 22 and 22B either with the inking pad or with the recorder chart. This will become more clear from the following description of the actual construction of a mechanism for bringing the printing points 22 and 22B first into contact with an inking pad (not shown in Fig. 17) and then into contact with the recorder chart.

The magneto 166, or equivalent, may also be used to inject into the measuring network 10 a voltage proportional to the speed of rebalance of the network in avoidance of overshooting of the balance point. The network comprising resistors 167, 169, 171, varistor 170 and condenser 168 is included for the purpose of damping when the detector 12 is of the galvanometer type.

Referring to Figs. 20 to 22, the supporting sprockets 157 for the tractor chain or endless belt 155 are rotatably mounted upon a frame 112A which is secured to the rock shaft 102. To effect a printing operation, the shaft 102 is rocked, by mechanism previously described, from the position shown in Fig. 20 to the position shown in Fig. 22. During this movement, by mechanism now described, an inking pad 182 is brought into the path of the printing points 22B for transfer of ink thereto and then retracted to permit engagement of the freshly inked point or points with the chart. The inking strip or pad 182 is carried by a pair of arms 183 at opposite ends of the frame 112A. As only one end of the frame is shown, the description will be confined thereto, it being understood that a similar arrangement exists at the other end. The end of arm 183 remote from the inking pad 182 is pivotally connected at 194 to the free end of a lever 185 mounted at its other end upon the pivot 184 attached to the frame 112A. The link 184 is provided with a slot 186 which receives a stationary pin 187 secured to the frame of the recorder mechanism. The inking arm 183 is biased by spring 188 into engagement with a stop 189, preferably a roller at the lower end of a slide 190 which is adjustably secured as by screw 191 to the frame member 112A. With the parts in the inactive position shown in Fig. 20, the inking pad 182 is out of the path of the printing points 22B and the latter are away from the chart roll 29.

As the frame or mount 112a is swung clockwise from the position shown in Fig. 20 to the position shown in Fig. 21, the engagement of fixed pin 187 with the slot or groove 186 causes the inking bar 183 to move to the left and when the inking pad 182 is in position below the path of the printing points 22B, the stop 189 moves into the notch 192 of the bar 183 allowing bar 183 to swing upwardly to the position shown in Fig. 21 for engagement of pad 182 by the tips of the printing points 22B. As frame 112a continues to swing, now in counterclockwise direction, toward the position shown in Fig. 22, the engagement between the stationary pin 187 and the slot 186 of link 184 causes the arm 183 to move to the right away from the printing points to allow contact thereof with the recorder chart and the roller 189 comes into engagement with the sloping face 193 of the pad arm 183 to allow arm 183 to move, under the action of spring 188, toward the frame 112a and away from the chart roll 29.

The inking arrangement described insures that the points 22B shall not be dry when moving into engagement with the chart 25.

Figures 23, 24:
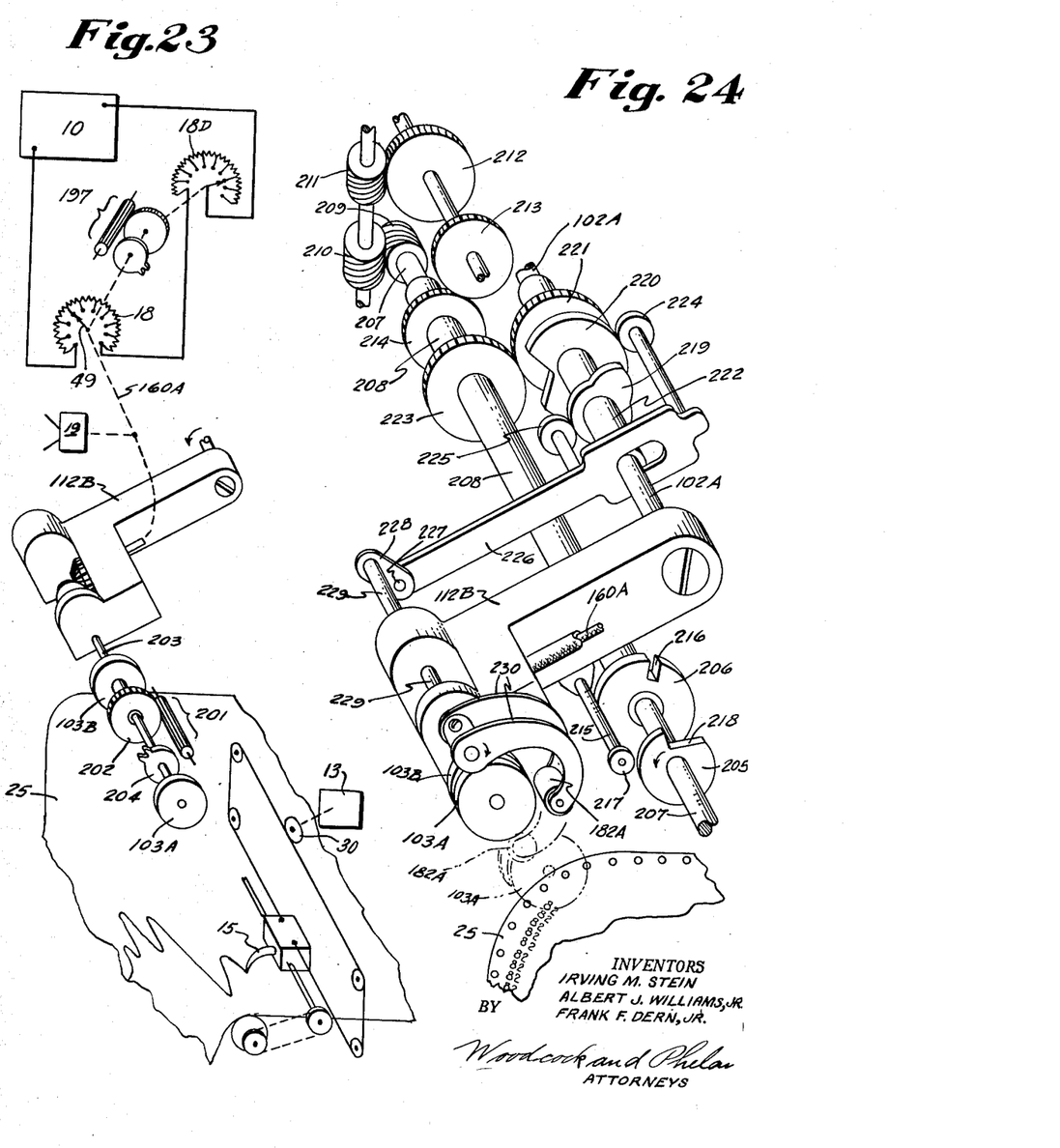
Fig. 23 schematically illustrates a measuring system having two or more range impedances.
Fig. 24 is a perspective view of an arrangement suited for effecting printing and inking movements of recorder mechanism shown in Fig. 23.

In the arrangement shown in Figs. 23 and 24, when the contact of range-impedance 18 moves in one direction beyond the first fixed contact or beyond the last fixed contact when moving in the opposite direction, the Geneva mechanism 197 is effective to adjust the movable contact of a second range-resistance 18D one step, backward or forward, depending upon the direction of movement of the contact of the first range-impedance 18. By way of example, the impedance 18 may be adjustable in nine steps of one ohm each and the range resistor 18D may be adjustable in nine steps each of ten ohms: thus, the total range of the two impedances is 99 ohms adjustable in one ohm steps from zero to 99, the slidewire giving a one ohm vernier adjustment. The total measuring range may obviously be extended by using another range resistor with a Geneva between it and the range resistor 18D, and so on as may be desired. The step adjustment of range-impedance 18 under control of the motor device 19 is transmitted to the print wheel 103A through a flexible shaft 160A. Thus, as in modifications previously described, each time the range of resistor 18 is changed, the print wheel is moved to a corresponding position so that the appropriate character or numeral is impressed upon the chart 25 when the supporting bracket 112B is rocked towards the chart. Concurrently with operation of the Geneva 197 to effect stepping adjustment of the second range impedance 13D, the Geneva mechanism 201 is effective to step the second print wheel 103B one step forward or backward as the case may be. The second print wheel 103B and gear 202 of the Geneva mechanism rotate in unison upon the drive shaft 203 of the print wheel 103A. The Geneva gear 204 rotates in unison with the print wheel 103A, and for each revolution thereof engages the bridging gear 201 which is suitably supported from the bracket 112B. Although for clarity in Fig. 23 the printing wheels and Geneva elements are widely separated, actually the mechanism is quite compact so that the two print wheels 103B, 103A are side by side, Fig. 24, so that the characters printed by wheel 103A appear in the "digit" column, and the characters printed by wheel 103B appear in the "tens" column.

The arrangement for effecting rocking movement of the frame 112B and for effecting inking of the print wheels 103A, 103B is shown in Fig. 24. The supporting bracket or frame 112B is biased for rotation about a stationary shaft 102A for movement toward the chart roll. The movements of the bracket 112B toward and from the chart roll are controlled by the cams 205, 206. The former is attached to the shaft 207 which in a particular instrument rotates at a speed of about 25 revolutions per minute. The cam 206 is attached to a sleeve 208 freely rotatable on shaft 207, the sleeve being rotated at a much slower speed, for example, one revolution per minute through a gear train including the gears 209—214. The bar or shaft 215 extending from the bracket 112B rides along the periphery of the cam 206 shaped generally as indicated in Fig. 24. The movement of the bracket 112B towards the chart roll cannot occur until there exists a precise angular relationship between the two cams 205 and 206. As shown in Fig. 24, to the end of shaft 215 is attached a roller 217 which engages the periphery of cam 205. When the cams 205, 206 are of such angular position that cam follower 215 may enter the notch 216 of cam 206 and roller or cam follower 217 may enter the notch 218 of cam 205, then and then only are the print wheels brought into engagement with the chart paper. The print wheel support 112B is moved away from the chart roll by engagement between the rise of the more rapidly moving cam 205 and the cam follower 217 supported from bracket 112B.

In each printing cycle, the inking roller 182A is swung into and out of contact with the periphery of the print wheels 103A, 103B before they are brought into engagement with the chart 25. It is thus insured that the printing characters are inked even though the print wheels may long remain in the same range-position. The necessarily precise timing required for such movement of the inking roll is effected by cams 219—220 which are fastened together with gear 221 upon a sleeve 222 freely rotatable upon the stud shaft 102A upon which bracket 112B is pivotally mounted. The cams 219 and 220 are rotated in unison with the low speed cam 206 through the sleeve 208, gear 223 and aforesaid gear 221. The cam followers 224 and 225 which respectively engage the cams 220 and 219 are supported from a crosshead 226 pivotally connected at 227 to crank arm 228 attached to one end of shaft 229. The arms 230, 230 for supporting the inking roll 182A are attached to the other end of shaft 229.

Thus, between successive movements of the printing wheels towards the recorder sheet, the inking roller 182 is swung into wiping engagement with the under faces of the printing wheels and is thereafter retracted.

It shall be understood the invention is not limited to the particular embodiments illustrated and described and that modifications may be made within the scope of the appended claims.

What is claimed is:

1. A recorder comprising a slidewire adjustable to balance a measuring network, a printing element moved concurrently with adjustment of said slidewire, mechanism for periodically moving said element into engagement with the chart of said recorder, means producing an electrical effect of magnitude dependent upon the speed of adjustment of said slidewire, and electromechanical means responsive to said electrical effect temporarily to preclude operation of said printing element by said mechanism during rapid adjustment of said slidewire.

2. A recorder comprising a slidewire adjustable to balance a measuring network, a printing element moved concurrently with rebalancing adjustment of said slidewire, actuating mechanism for periodically moving said printing element into engagement with the chart of said recorder, means for producing a voltage of magnitude dependent upon the speed of adjustment of said slidewire, connections for introducing said voltage into said network in avoidance of overshooting of the balance point, and electromechanical means responsive to said voltage temporarily to preclude operation of said printing element by said actuating mechanism during rapid adjustment of said slidewire.

3. A multi-range recorder comprising a range-impedance adjustable step-by-step and a smoothly variable impedance both included in a balanceable network for measurement of a variable throughout consecutive ranges of measurement, means responsive to positioning of the adjustable element of said smoothly variable impedance adjacent opposite limits to step said range-impedance to its next higher or lower setting for balancing of said network within the limits of said smoothly variable impedance, recording means coupled to said range-impedance for adjustment in step therewith to record in a marginal zone of the recorder chart a coarse indication of the measured variable, and recording means coupled to said adjustable element of the smoothly variable impedance for vernier recording of the measured variable in a contiguous zone of the recorder chart, the recordings jointly precisely indicating the magnitude of the measured variable.

4. A multi-range recorder as in claim 3, in in which the recording means respectively coupled to the range-impedance and the smoothly variable impedance are distinct entities.

5. A multi-range recorder as in claim 3, in which a single recording means is at different times effectively coupled to said range-impedance and to said smoothly variable impedance.

6. A multi-range recorder comprising a range-impedance adjustable step-by-step and a smoothly variable impedance both included in a balanceable network for measurement of a variable throughout consecutive ranges of measurement, a second range-impedance adjustable step-by-step and a second smoothly variable impedance both included in a second balanceable network, means responsive to positioning of the adjustable element of the first-named smoothly variable impedance adjacent opposite limits to step said first-named range-impedance to its next higher or lower setting for balancing of said first-named network within the limits of said first-named variable impedance and concurrently to step said second-named range-impedance to its next higher or lower setting, a detector responsive at different times to the unbalances of said networks to effect rebalancing adjustments of said smoothly variable impedances, and recording means repositioned by the rebalancing adjustments to record a coarse indication of the magnitude of the measured variable while the detector is responsive to unbalance of said second network and to record a vernier indication of the magnitude of the measured variable while the detector is responsive to unbalance of said first network.

7. A multi-range recorder as in claim 4 in which the recording means coupled to the smoothly variable impedance is a curve-tracing element, and in which the recording means coupled to the range-impedance is a print-wheel with peripherally spaced characters respectively corresponding with steps of the range impedance.

8. A multi-range recorder as in claim 4 in which each of the two recording means is a curve-tracing element engaging the chart in the corresponding one of said zones.

9. A multi-range recorder comprising a range-impedance adjustable step-by-step and a smoothly variable impedance both included in a balanceable network for measurement of a variable throughout consecutive ranges of measurement, recording means including a range-printing element coupled to said range-impedance, a mount for said range-printing element, means responsive to positioning of the adjustable element of said smoothly variable impedance adjacent opposite limits to step said range-impedance to its next higher or lower setting for balancing of said network within limits of said smoothly variable impedance and concurrently to step said range-printing element in either direction to a position corresponding with the new higher or lower measuring range, and actuating mechanism for intermittently moving said mount toward and from the chart of said recorder to effect printing thereon by said element of the range-impedance settings for which the network was balanced by adjustment of the smoothly variable impedance.

10. A multi-range recorder as in claim 9 in which the range-printing element is a print-wheel angularly stepped in either direction to positions corresponding with the range-impedance settings, which additionally includes an inking wheel for engagement with such print-wheel, and in which the mechanism for moving the mount of the print-wheel includes a differential for rotating the print-wheel between successive movements of the mount for transfer of ink from the inking roll and so insure legible printing on the chart when the same range setting is repeatedly printed for successive movements of the mount.

11. A multi-range recorder as in claim 9 in which the mount of the range-printing element is stepped laterally in either direction transversely of the recorder chart to positions respectively corresponding with the settings of the range-impedance.

12. A multi-range recorder as in claim 9 which additionally includes means for precluding movement of said printing-element mount when said adjustable element rapidly approaches either of said limits for stepping of said range-impedance to higher or lower setting including means producing an electrical effect of magnitude varying in accordance with the speed of said element, and electromechanical means responsive to said electrical effect to disable said actuating mechanism during rapid movement of said adjustable element.

13. A multi-range recorder as in claim 12 which additionally includes connections for introducing said electrical effect into said balanceable network including said range-impedance and said smoothly variable impedance in opposition to the unbalance of the network.

14. A recorder comprising printing means including at least one printing element positioned in accordance with variations to be recorded, a pivotally-supported mount for said element intermittently rocked toward and from the chart of said recorder for effecting successive engagements therewith of said printing element, a link pivotally supported on said mount, a stationary member coacting with said link to swing it toward and back from said printing element upon rocking movement of said mount toward the chart, an arm pivotally connected to said link and having a cam surface, means for biasing said arm toward said mount, an inking element carried by said arm for movement respectively toward and back from a position between said printing element and the chart during movement of said mount away from and toward the chart, and a stop carried by said mount and coacting with said cam surface to permit said biasing means to effect engagement between said inking and printing elements when said arm is in said position.

IRVING M. STEIN.
ALBERT J. WILLIAMS, Jr.
FRANK F. DERN, Jr.

References Cited in the file of this patent

UNITED STATES PATENTS

| Number | Name | Date |
|---|---|---|
| 421,623 | Shaw | Feb. 18, 1890 |
| 721,187 | Hepp | Feb. 24, 1903 |
| 2,005,108 | Pudelko | June 18, 1935 |
| 2,113,069 | Ross et al. | Apr. 5, 1938 |
| 2,125,345 | Hunt | Aug. 2, 1938 |
| 2,207,343 | Fairchild | July 9, 1940 |
| 2,207,344 | Fairchild | July 9, 1940 |
| 2,209,717 | Fairchild et al. | July 30, 1940 |
| 2,288,679 | Caldwell | July 7, 1942 |
| 2,297,187 | Johnson | Sept. 29, 1942 |
| 2,400,828 | Keinath | May 21, 1946 |
| 2,428,129 | Smith | Sept. 30, 1947 |
| 2,464,708 | Moseley | Mar. 15, 1949 |
| 2,467,929 | Colt | Apr. 19, 1949 |
| 2,485,730 | Giffen et al. | Oct. 25, 1949 |
| 2,506,006 | Wild | May 2, 1950 |

FOREIGN PATENTS

| Number | Country | Date |
|---|---|---|
| 120,169 | Austria | July 9, 1945 |